US012775774B2

(12) United States Patent
Lee et al.

(10) Patent No.: US 12,775,774 B2
(45) Date of Patent: Oct. 27, 2026

(54) LEARNING-BASED PLACEMENT OF FLEXIBLE CIRCUIT BLOCKS

(71) Applicant: MediaTek Inc., Hsinchu City (TW)

(72) Inventors: Jen-Wei Lee, Hsinchu City (TW); Yi-Ying Liao, Hsinchu City (TW); Te-Wei Chen, Hsinchu City (TW); Yu-Hsiu Lin, Hsinchu City (TW); Chia-Wei Chen, Hsinchu City (TW); Chun-Ku Ting, Hsinchu City (TW); Sheng-Tai Tseng, Hsinchu City (TW); Ronald Kuo-Hua Ho, Hsinchu City (TW); Hsin-Chuan Kuo, Hsinchu City (TW); Chun-Chieh Wang, Hsinchu City (TW); Ming-Fang Tsai, Hsinchu City (TW); Chun-Chih Yang, Hsinchu City (TW); Tai-Lai Tung, Hsinchu City (TW); Da-Shan Shiu, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 770 days.

(21) Appl. No.: 18/315,712

(22) Filed: May 11, 2023

(65) Prior Publication Data

US 2023/0376671 A1 Nov. 23, 2023

Related U.S. Application Data

(60) Provisional application No. 63/373,207, filed on Aug. 23, 2022, provisional application No. 63/343,111, filed on May 18, 2022.

(51) Int. Cl.

| | |
|---|---|
| ***G06F 30/398*** | (2020.01) |
| ***G06F 30/392*** | (2020.01) |
| *G06F 111/20* | (2020.01) |

(52) U.S. Cl.

CPC .......... *G06F 30/398* (2020.01); *G06F 30/392* (2020.01); *G06F 2111/20* (2020.01)

(58) Field of Classification Search

CPC .. G06F 30/398; G06F 30/392; G06F 2111/20; G06F 30/27; G06N 3/06; G06N 3/061; G06N 3/08

USPC .......................................................... 716/100

See application file for complete search history.

(56) References Cited

U.S. PATENT DOCUMENTS

2023/0153506 A1 * 5/2023 Park ....................... G06N 3/092 716/103

OTHER PUBLICATIONS

J. Schulman et al. “Proximal Policy Optimization Algorithms,” arXiv:1707.06347v2 [cs.LG], Aug. 28, 2017.

* cited by examiner

*Primary Examiner* — Paul Dinh

(74) *Attorney, Agent, or Firm* — Tong J. Lee

(57) ABSTRACT

A neural network based method places flexible blocks on a chip canvas in an integrated circuit (IC) design. The neural network receives an input describing geometric features of a flexible block to be placed on the chip canvas. The geometric features includes an area size and multiple aspect ratios. The neural network generates a probability distribution over locations on the chip canvas and the aspect ratios of the flexible block. Based on the probability distribution, a location on the chip canvas is selected for placing the flexible block with a chosen aspect ratio.

20 Claims, 5 Drawing Sheets

LEARNING-BASED PLACEMENT OF FLEXIBLE CIRCUIT BLOCKS

CROSS-REFERENCE TO RELATED APPLICATIONS

This application claims the benefit of U.S. Provisional Application No. 63/343,111 filed on May 18, 2022, and U.S. Provisional Application No. 63/373,207 filed on Aug. 23, 2022, the entirety of both which is incorporated by reference herein.

TECHNICAL FIELD

Embodiments of the invention relate to methods and apparatuses based on machine learning for placing circuit blocks with flexible aspect ratios on a semiconductor chip.

BACKGROUND OF THE INVENTION

Floor planning is an early stage in integrated circuit (IC) design. During the floor-planning stage, circuit designers explore options for placing circuit blocks on a chip canvas. The register-transfer language (RTL) code and netlist of the circuit block may not have been generated.

Macro placement comes after the floor-planning stage after one or more placement options are selected. A macro contains post-synthesized descriptions of a circuit block. The logic and electronic behavior of the macro are given but the internal structural description may or may not be known. Mixed-size macro placement is the problem of placing macros of various sizes on a chip canvas to optimize an objective such as the wirelength, congestion, etc.

Regardless of which stage in the IC design flow, the number of circuit blocks involved in the placement can be on the order of hundreds or thousands. The placement of circuit blocks is a complicated and time-consuming process and typically relies on the manual efforts of human experts. The reliance on manual efforts severely limits the number of placement options that can be explored within a reasonable time. As a result, the manual placement may be suboptimal. If the chip design later calls for a different placement, the high iteration cost and impact on the schedule and resources would be prohibitive. Thus, there is a need to improve the quality and efficiency of circuit block placement.

SUMMARY OF THE INVENTION

In one embodiment, a method is provided for placing flexible blocks on a chip canvas in an integrated circuit (IC) design. A neural network receives an input describing geometric features of a flexible block to be placed on the chip canvas. The geometric features includes an area size and multiple aspect ratios. The neural network generates a probability distribution over locations on the chip canvas and the aspect ratios of the flexible block. Based on the probability distribution, a location on the chip canvas is selected for placing the flexible block with a chosen aspect ratio.

In another embodiment, a system is provided for placing flexible blocks on a chip canvas in an IC design. The system includes memory to store descriptions of the flexible blocks. The system further includes one or more processors coupled to the memory. At least one of the processors performs operations of a neural network. The one or more processors are operative to receive an input to the neural network, where the input describes geometric features of a flexible block to be placed on the chip canvas. The geometric features include an area size and multiple aspect ratios. The neural network generates a probability distribution over locations on the chip canvas and the aspect ratios of the flexible block. The one or more processors are operative to select a location on the chip canvas for placing the flexible block with a chosen aspect ratio based on the probability distribution.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION OF THE INVENTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

A learning-based neural network is described for placing flexible blocks on a chip canvas in an integrated circuit (IC) design process. The term "flexible block" as used herein refers to a circuit block that has a fixed area and a flexible shape. In one embodiment, the shape is defined by an aspect ratio, which is the ratio of width to height of a rectangle. When placing a flexible block, a placement tool that uses the neural network not only determines the placement location but also the shape of the flexible block. The placement tool may be part of an electronic design automation (EDA) tool.

In one embodiment, a flexible block may be described by schematics for which register-transfer level (RTL) code has not been written or completed. For example, a flexible block may be a proprietary intellectual property (IP) core; e.g., a hardware subsystem (microprocessor, controller, universal serial bus (USB), image processor, etc.). Automating the floor planning and placement of flexible blocks can significantly shorten the time spent on design exploration and the overall IC design process. For example, a placement tool based on a reinforcement-learning (RL) neural network can place hundreds of flexible blocks within a few hours with reasonable quality. The increased placement speed allows a circuit designer to explore more design choices within a limited design time frame.

Alternatively, a flexible block may be an RTL-coded circuit module or a post-synthesized circuit module such as a macro (e.g., a memory circuit such as static random access memory (SRAM)). Thus, the placement of flexible blocks described herein may be performed in any stage of an IC design process including an early exploration stage of floor planning and a post-synthesis stage.

Figure 1:
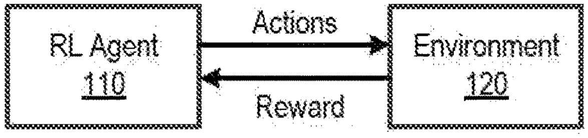
FIG. 1 is a diagram of reinforcement learning for flexible block placement according to one embodiment.

FIG. 1 is a block diagram illustrating reinforcement learning (RL) for flexible block placement according to one embodiment. An RL agent 110 receives an input including a state of a chip canvas and a description of a flexible block to be placed on the chip canvas. RL agent 110 performs neural network operations on the input and outputs an action for placing the flexible block. After all of the flexible blocks are placed, the final state of the canvas (also referred to as a floorplan) is evaluated by an environment 120 to produce a reward. The reward may include an estimate of wirelength, congestion, etc. The operations of environment 120 may be performed by a computing system. The environment's evaluation result is fed back to agent 110 for RL agent 110 to adjust its parameters and/or to determine whether to continue the reinforcement learning process. In one embodiment, environment 120 may also generate action masks that block out areas of the chip canvas for RL agent 110 to generate the actions. Details about the action masks will be provided with reference to FIG. 4 and FIG. 5.

Figure 2:
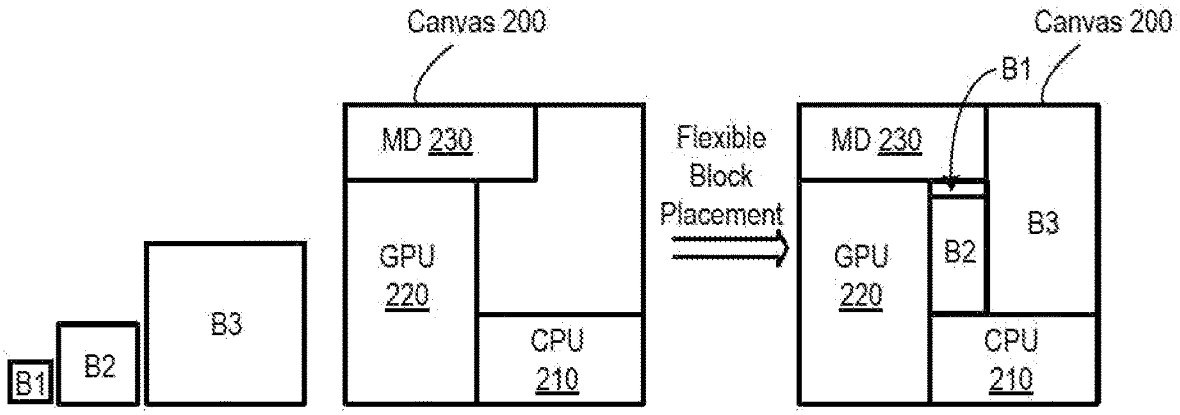
FIG. 2 is a diagram illustrating an example of flexible block placement according to one embodiment.

FIG. 2 illustrates an example of flexible block placement according to one embodiment. Initially, a chip canvas 200 has three blocks placed thereon; e.g., a CPU block 210, a GPU block 220, and a modem block (MD) 230. Three flexible blocks B1, B2, and B3 are to be placed in the remaining space on chip canvas 200. Each flexible block may have multiple aspect ratios for a given area size and wire connections. A placement tool that incorporates RL agent 110 (FIG. 1) selects not only a placement location on chip canvas 200, but also an aspect ratio for the flexible block. As shown in FIG. 2, the aspect ratio of each flexible block may be selected such that all of the flexible blocks can fit into the remaining space on chip canvas 200.

Figure 3:
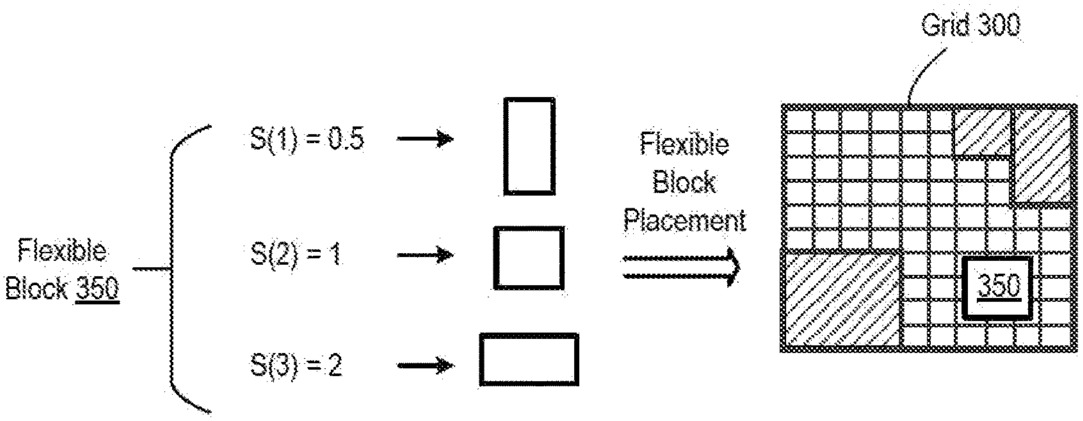
FIG. 3 is a diagram illustrating another example of flexible block placement according to one embodiment.

FIG. 3 is a diagram illustrating another example of flexible block placement according to one embodiment. In this example, a chip canvas is represented by a grid 300, which is formed by equal-sized grid cells organized in rows and columns. Each grid cell has a size of (1 unit length×1 unit length). The location of each grid cell is identified by (x, y), where x is the horizontal coordinate and y is the vertical coordinate. Initially, grid 300 is occupied by three blocks (indicated by blocks with slanted lines). Flexible blocks are to be placed, one by one, in the remaining empty space of grid 300. When placing a flexible block on grid 300, the center of the flexible block is to coincide with the center of a grid cell. FIG. 3 shows that a flexible block 350 is to be placed on grid 300. Flexible block 350 has a given area size with three different aspect ratios, one of which can be chosen for placement. The aspect ratios for a flexible block may be indicated by an array S(r), where r is referred to as an aspect ratio index. In this example, S(1)=0.5, S(2)=1, and S(3)=2. As mentioned above in connection with FIG. 1, RL agent 110 may choose an (x, y) coordinate and an aspect ratio index r for the placement of a flexible block.

Figure 4:
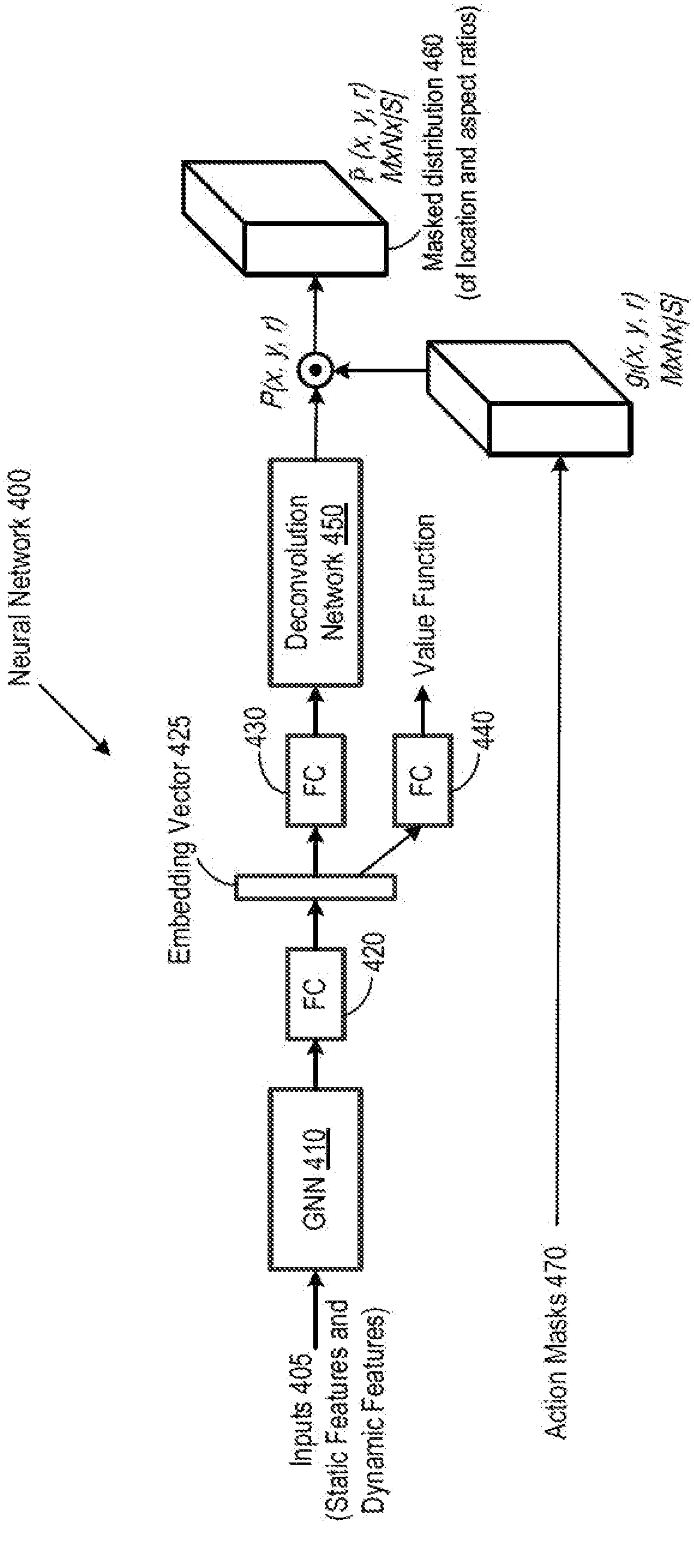
FIG. 4 is a diagram of a neural network architecture for flexible block placement according to one embodiment.

FIG. 4 is a diagram of a neural network architecture for flexible block placement according to one embodiment. A neural network (NN) 400 includes a graph neural network (GNN) 410 to receive an input 405 that includes static features and dynamic features. The static features of a flexible block may include the flexible block's area size, a set of aspect ratios, wire connections, etc. The dynamic features may include the current state of the chip canvas. The output of GNN 410 is fed into a fully-connected (FC) network 420, which outputs a low-dimension vector (e.g., 32×1), called an embedding vector 425 representing the features extracted from input 405. Embedding vector 425 is fed into a second FC network 430, which is connected to a multi-layered deconvolution network 450 to generate a probability distribution P(x, y, r) of an action. The probability distribution describes the probability of an action of placing a flexible block with an aspect ratio index r on a grid coordinate (x, y). The action space, which is the space over which P(x, y, r) spans, is of size M×N×|S|, where M×N is the number of grid cells on the chip canvas, and |S| is the number of aspect ratios of the flexible block. The probability distribution P(x, y, r) is a joint probability of locations and aspect ratios. In one embodiment, a log joint probability of locations and aspect ratios log P(x, y, r) may be used.

Embedding vector 425 is also fed into a third FC network 440 to generate a value function (VF). The value function outputs a predicted reward value for the action, which is used to update the coefficients of neural network 400. For example, the neural network's coefficients can be updated using a Proximal Policy Optimization (PPO) gradient estimator with generalized advantage estimation.

For each flexible block to be placed, multiple action masks may be generated to block out grid cells based on a density constraint. For density threshold=1, a grid cell is blocked out if placing a given block on the grid cell would cause the sum of occupied areas in the grid cell to exceed 1. An action mask is a function of the aspect ratio of a given block to be placed. That is, different aspect ratios of a given block correspond to different action masks. The action masks may be indicated by $g_t$(x, y, r), which spans over a space of size M×N×|S|. In one embodiment, when the action masks $g_t$(x, y, r)=0, it means that the grid cell (x, y) is blocked for a flexible block with aspect ratio index r, and when $g_t$(x, y, r)=1, it means that the grid cell (x, y) is not blocked for placing the flexible block with aspect ratio index r. A placement tool sets $g_t$(x, y, r)=0 if the flexible block placed at the center of grid cell (x, y) with the r-th aspect ratio in set S causes the density of any grid cell to exceed the density threshold. Otherwise, the placement tool sets the action masks $g_t$(x, y, r)=1.

The action masks $g_t$(x, y, r) may be applied to the probability distribution P(x, y, r) to set the blocked areas to a zero probability value. A masked distribution $\hat{P}$(x, y, r) 460 of size is M×N×|S| is calculated by applying action masks 470 to the probability distribution P(x, y, r). In one embodiment, masked distribution 460 spans over the action space formed by the valid placement locations and the available aspect ratios of a flexible block. With a deterministic policy, the highest probability according to masked distribution 460 may be chosen to place the flexible block. With a stochastic policy, an action may be sampled according to masked distribution 460.

After the placement of the flexible block, the state of the chip canvas is updated and a next flexible block is to be placed on the updated canvas. After all flexible blocks are placed, a reward is calculated. In one embodiment, the reward may be expressed as an objective function that minimizes the wirelength subject to a non-overlapping constraint. An example of the reward may be formulated as follows:

$$R_{p,g}=-W(p,g)\text{ s.t. density}(p,g)\leq\text{density threshold}$$

where g: graph (design input), p: placement, and W is the wirelength measurement.

The design input (g) describes the fixed blocks and the flexible blocks on the chip canvas, and the placement (p) describes the blocks' placement on the chip canvas. The placement process may iterate a predetermined number of times or for a predetermined time period, or when the reward has reached a steady state or a given goal. After neural network 400 is trained with a training set, the trained neural network 400 can be used to place flexible blocks on a given chip canvas. In the present embodiment, the fixed block is a circuit block being placed at the fixed location on the given chip canvas. The fixed block has a fixed area and a fixed shape as well.

Figure 5A:
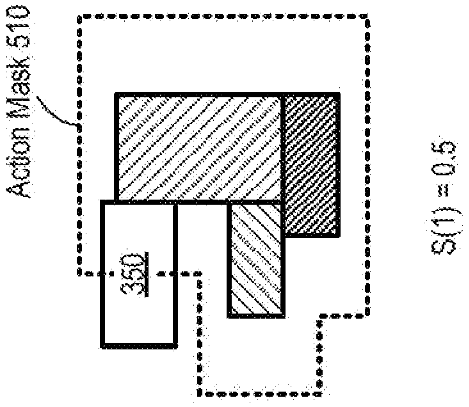
FIG. 5A, FIG. 5B, and FIG. 5C illustrate examples of action masks for three different aspect ratios of a flexible block according to some embodiments.
Figure 5B:
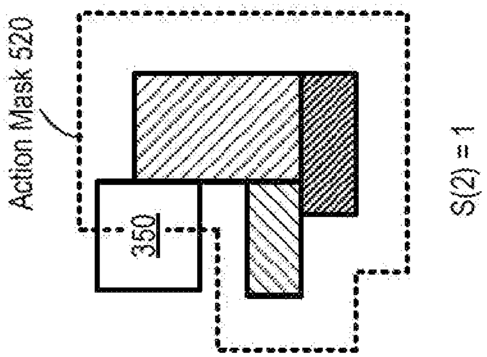
Figure 5C:
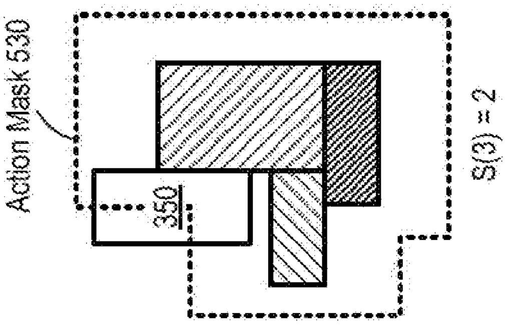

FIG. 5A, FIG. 5B, and FIG. 5C illustrate examples of action masks for three different aspect ratios of a flexible block according to some embodiments. The action masks may be used to enforce the aforementioned non-overlapping constraint. In these examples, the density threshold is set to 1, which means that the sum of the occupied areas within each grid cell cannot exceed 1 (where each grid cell is of size one). For example, if block A occupies 60% of the grid cell and block B occupies 50% of the same grid cell, the sum of the occupied areas is 110% which exceeds 1. In these examples, three blocks (indicated by blocks filled with slanted lines) have already been placed on the canvas. Due to the density threshold constraint, the center of a next flexible block (e.g., flexible block 350) cannot be placed within the region marked by the dotted borderline. The center of flexible block 350 can be placed outside or on the dotted borderline. The region inside the dotted borderline is an action mask (510, 520, or 530) for flexible block 350.

FIG. 5A shows action mask 510 for flexible block 350 with aspect ratio S(1)=0.5. FIG. 5B shows action mask 520 for flexible block 350 with aspect ratio S(2)=1. FIG. 5C shows action mask 530 for flexible block 350 with aspect ratio S(3)=2. Action masks 510, 520, and 530 have shapes different from one another due to the different corresponding aspect ratios. Referring to FIG. 4, when a description of flexible block 350 is sent to neural network 400 as input 405, the corresponding action masks 470 include an action mask for each aspect ratio of flexible block 350 are generated. Neural network 400 generates a probability distribution and action masks 470 are applied to the probability distribution to produce a masked distribution 460. After flexible block 350 is placed on the canvas based on masked distribution 460, the computing system (which performs the operation of environment 120 in FIG. 1) generates a next set of action masks to prevent the next flexible block from violating the density threshold. Each action mask in the next set of action masks corresponds to an aspect ratio of the next flexible block.

Figure 6:
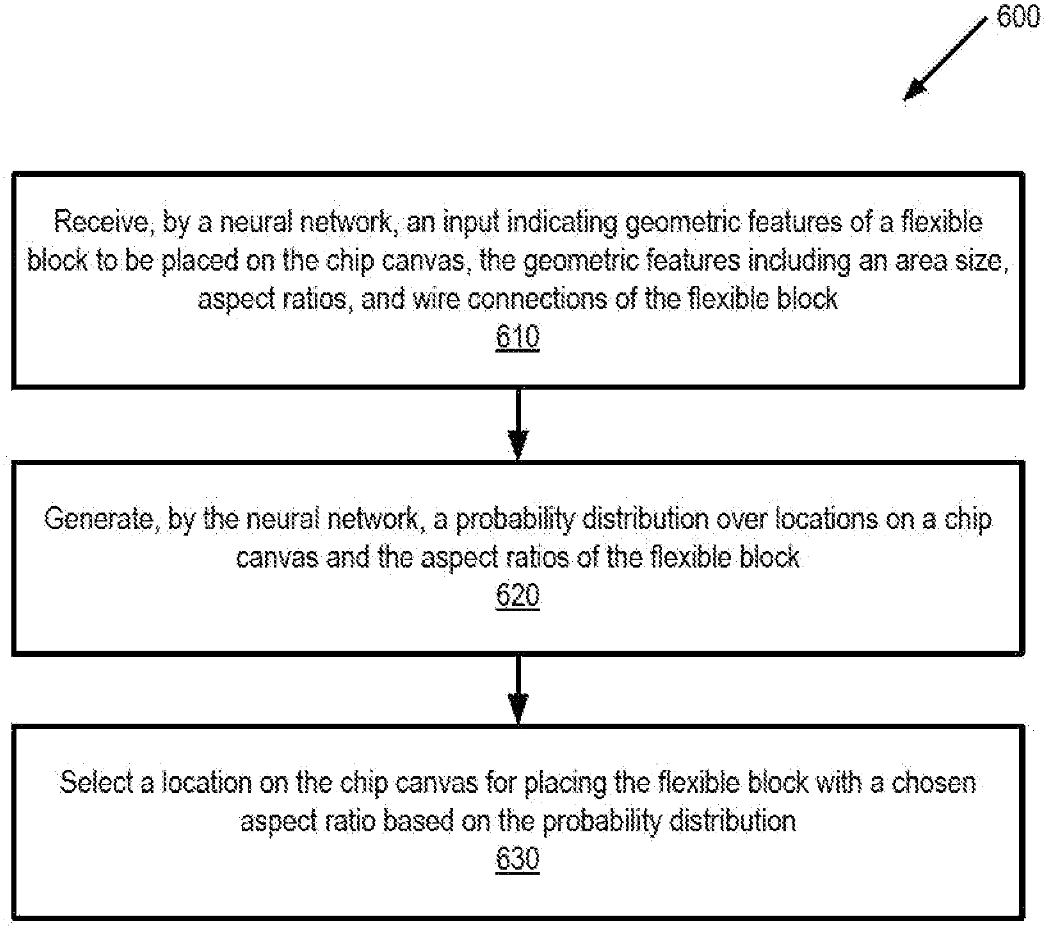
FIG. 6 is a flow diagram illustrating a method for placing flexible blocks on a chip canvas in an IC design according to one embodiment.

FIG. 6 is a flow diagram illustrating a method 600 for placing flexible blocks on a chip canvas in an IC design according to one embodiment. In one embodiment, a neural network (e.g., neural network 400) is used to calculate a probability distribution of placement locations and aspect ratios. In one embodiment, method 600 may be performed by a placement tool executed by a computing system such as a system 700 in FIG. 7.

Method 600 starts with step 610 when a neural network executed by a computing system receives an input that indicates the geometric features of a flexible block to be placed on the chip canvas. The geometric features include an area size and multiple aspect ratios. At step 620, the neural network generates a probability distribution over locations on the chip canvas and the aspect ratios of the flexible block. At step 630, a location on the chip canvas is selected for placing the flexible block with a chosen aspect ratio based on the probability distribution.

In one embodiment, the computing system generates action masks for the respective aspect ratios of the flexible block. Each action mask is to block out a region of the chip canvas for a corresponding aspect ratio of the flexible block. Each action mask is to block out the region in which the placement of the flexible block violates a non-overlapping constraint. The computing system applies the action masks to the probability distribution to generate a masked distribution. Regions of the chip canvas that are blocked out by the action masks are set to a probability value of zero.

In one embodiment, after the placement of all of the flexible blocks on the chip canvas, the computing system calculates a wirelength measurement based on wire connections of the flexible blocks. The computing system may generate multiple floorplans, with each floorplan corresponding to a different placement of the flexible blocks and fixed blocks on the chip canvas. The computing system calculates a wirelength measurement for each floorplan, and selects one of the floorplans that minimizes the wirelength measurement.

In one embodiment, the chip canvas is represented by a grid of equal-sized grid cells. The computing system generates an action mask to block out the grid cells in which the placement of the flexible block violates a density threshold that specifies a maximum sum of occupied areas in each grid cell. The occupied areas in each grid cell include areas occupied by fixed blocks and the flexible blocks. The computing system generates the probability distribution over an action space. The size of the action space is defined by the size of the grid and the number of aspect ratios of the flexible block.

In one embodiment, the neural network includes a graph neural network, fully-connected networks, and deconvolution networks. In one embodiment, the flexible block is described by schematics without an RTL description. In one embodiment, the flexible block is described by an RTL description or a synthesized netlist.

Figure 7:
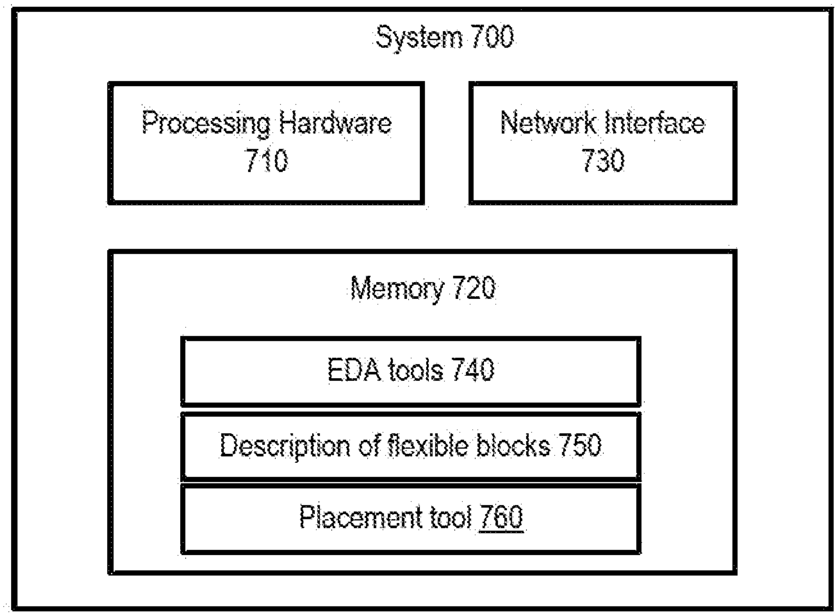
FIG. 7 is a block diagram illustrating a system operative to perform flexible block placement according to one embodiment.

FIG. 7 is a block diagram illustrating a system 700 operative to perform flexible block placement according to one embodiment. System 700 includes processing hardware 710, a memory 720, and a network interface 730. In one embodiment, processing hardware 710 may include one or more processors and accelerators, such as one or more of: a central processing unit (CPU), a GPU, a digital processing unit (DSP), an AI processor, a tensor processor, a neural processor, a multimedia processor, other general-purpose and/or special-purpose processing circuitry.

System 700 further includes memory 720 coupled to processing hardware 710. Memory 720 may include memory devices such as dynamic random access memory (DRAM), SRAM, flash memory, and other non-transitory machine-readable storage media; e.g., volatile or non-volatile memory devices. Memory 720 may further include storage devices, for example, any type of solid-state or magnetic storage device. In one embodiment, memory 720 may store one or more EDA tools 740 and a placement tool 760 for placing flexible blocks. Placement tool 760 may include one or more neural networks (e.g., neural network 400 in FIG. 4), AI agents, an RL agent (e.g., RL agent 110 in FIG. 1), an environment (e.g., environment 120 in FIG. 1) that interacts with the RL agent. Memory 720 may further store descriptions of flexible blocks 750 placed or to be placed on a chip canvas. In some embodiments, memory 720 may store instructions which, when executed by processing hardware 710, cause the processing hardware to perform the aforementioned methods and operations for flexible block placement and/or for training a neural network to perform flexible block placement.

In some embodiments, system 700 may also include a network interface 730 to connect to a wired and/or wireless network. It is understood the embodiment of FIG. 7 is simplified for illustration purposes. Additional hardware components may be included.

The operations of the flow diagram of FIG. 6 have been described with reference to the exemplary embodiments of FIG. 4 and FIG. 7. However, it should be understood that the operations of the flow diagram of FIG. 6 can be performed by embodiments of the invention other than the embodiments of FIG. 4 and FIG. 7, and the embodiments of FIG. 4 and FIG. 7 can perform operations different than those discussed with reference to the flow diagram. While the flow diagram of FIG. 6 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method of placing flexible blocks on a chip canvas in an integrated circuit (IC) design, comprising:

receiving, by a neural network, an input describing geometric features of a flexible block of circuits to be placed on the chip canvas, the geometric features of the flexible block including an area size and a plurality of aspect ratios, each aspect ratio defined by a ratio of width to height of the flexible block;

generating, by the neural network, a joint probability distribution over locations on the chip canvas and the aspect ratios of the flexible block; and selecting a location on the chip canvas for placing the flexible block with a chosen aspect ratio based on the joint probability distribution.

2. The method of claim 1, further comprising:

generating action masks for respective ones of the aspect ratios of the flexible block, each action mask to block out a region of the chip canvas for a corresponding aspect ratio.

3. The method of claim 2, wherein each action mask is to block out the region in which placement of the flexible block violates a non-overlapping constraint.

4. The method of claim 1, further comprising:

applying action masks to the probability distribution to generate a masked distribution, wherein regions of the chip canvas that are blocked out by the action masks are set to a probability value of zero.

5. The method of claim 1, further comprising:

after placement of all of the flexible blocks on the chip canvas, calculating a wirelength measurement based on wire connections of the flexible blocks.

6. The method of claim 1, further comprising:

calculating a wirelength measurement for each of a plurality of floorplans, each floorplan corresponding to a different placement of the flexible blocks and fixed blocks on the chip canvas; and selecting one of the floorplans that minimizes the wirelength measurement.

7. The method of claim 1, wherein the chip canvas is represented by a grid of a plurality of equal-sized grid cells, the method further comprises:

generating an action mask to block out the grid cells in which placement of the flexible block violates a density threshold that specifies a maximum sum of occupied areas in each grid cell.

8. The method of claim 7, wherein the occupied areas in each grid cell include areas occupied by fixed blocks and the flexible blocks.

9. The method of claim 1, wherein the chip canvas is represented by a grid of a plurality of equal-sized grid cells, the method further comprises:

generating the probability distribution over an action space, the size of the action space defined by the size of the grid and the number of the aspect ratios of the flexible block.

10. The method of claim 1, wherein the neural network includes a graph neural network, fully-connected networks, and deconvolution networks.

11. A system for placing flexible blocks on a chip canvas in an integrated circuit (IC) design, comprising:

memory to store descriptions of the flexible blocks; and one or more processors coupled to the memory, at least one of the processors operative to perform operations of a neural network, wherein the one or more processors are operative to:

receive an input to the neural network, the input describing geometric features of a flexible block of circuits to be placed on the chip canvas, the geometric features including an area size and a plurality of aspect ratios, each aspect ratio defined by a ratio of width to height of the flexible block;

generate, by the neural network, a joint probability distribution over locations on the chip canvas and the aspect ratios of the flexible block; and select a location on the chip canvas for placing the flexible block with a chosen aspect ratio based on the joint probability distribution.

12. The system of claim 11, wherein the one or more processors are further operative to:

generate action masks for respective ones of the aspect ratios of the flexible block, each action mask to block out a region of the chip canvas for a corresponding aspect ratio.

13. The system of claim 12, wherein each action mask is to block out the region in which placement of the flexible block violates a non-overlapping constraint.

14. The system of claim 11, wherein the one or more processors are further operative to:

apply action masks to the probability distribution to generate a masked distribution, wherein regions of the chip canvas that are blocked out by the action masks are set to a probability value of zero.

15. The system of claim 11, wherein the one or more processors are further operative to:

after placement of all of the flexible blocks on the chip canvas, calculate a wirelength measurement based on wire connections of the flexible blocks.

16. The system of claim 11, wherein the one or more processors are further operative to:

calculate a wirelength measurement for each of a plurality of floorplans, each floorplan corresponding to a different placement of the flexible blocks and fixed blocks on the chip canvas; and select one of the floorplans that minimizes the wirelength measurement.

17. The system of claim 11, wherein the chip canvas is represented by a grid of a plurality of equal-sized grid cells, the one or more processors are further operative to:

generate an action mask to block out the grid cells in which placement of the flexible block violates a density threshold that specifies a maximum sum of occupied areas in each grid cell.

18. The system of claim 17, wherein the occupied areas in each grid cell include areas occupied by fixed blocks and the flexible blocks.

19. The system of claim 11, wherein the chip canvas is represented by a grid of a plurality of equal-sized grid cells, the one or more processors are further operative to:

generate the probability distribution over an action space, the size of the action space defined by the size of the grid and the number of the aspect ratios of the flexible block.

20. The system of claim 11, wherein the neural network includes a graph neural network, fully-connected networks, and deconvolution networks.

* * * * *